May 30, 1950      A. SZERENYI      2,509,706

BEATER

Filed Feb. 21, 1947

INVENTOR
A. SZERENYI
By: Fetherstonhaugh & Co.
ATT'YS

UNITED STATES PATENT OFFICE 2,509,706

BEATER

Andrew Szerenyi, Toronto, Ontario, Canada

Application February 21, 1947, Serial No. 729,967

1 Claim. (Cl. 259—128)

This invention relates to beaters, that is beaters of the variety commonly referred to as egg beaters.

The invention may comprise various arrangements of links and levers depending on whether the beater is intended for operation by one or two hands.

Various embodiments of the invention are illustrated in the accompanying drawings in which.

Figure 1:
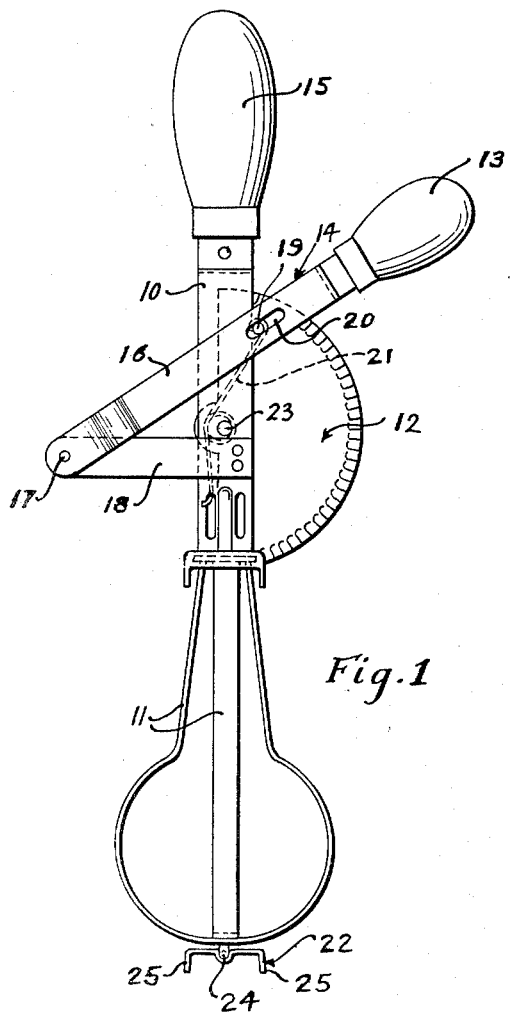
Figure 1 is a side view of an egg beater according to the invention designed for operation by two hands.
Figure 2:
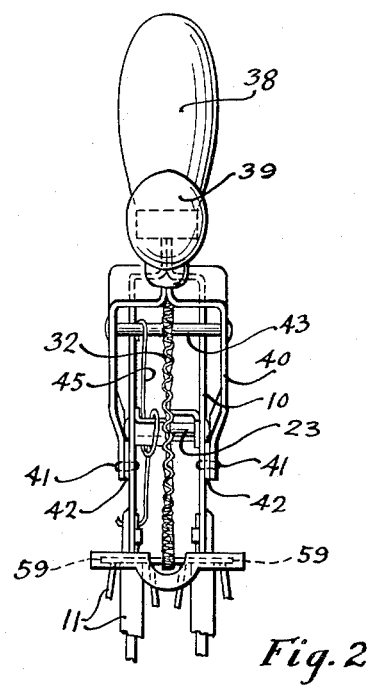
Figure 2 is a fragmentary sectional view of the egg beater shown in Figure 1, the plane of section being at right angles to the plane of Figure 1 showing details of the operating mechanism.

Referring now more specifically to the drawings, an egg beater according to the invention includes a frame 10 adapted to support the various members of the egg beater, one or two beaters 11, a crimped wheel or segment 12, a depressible handle member 13, and a linkage 14 designed to translate depressional motion of the handle member 13 into rotational motion of the wheel 12.

Figure 3:
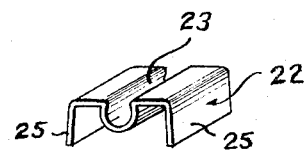
Figure 3 is a perspective view of a specially designed stabilizer used on an appropriate embodiment of the invention and shown in position in Figure 1.

A sturdy handle 15 is rigidly secured to the frame 10 and the depressible handle 13 is held directly on the end of the lever 16 which is pivoted at 17 onto a stationary arm 18 which is rigidly secured to the frame 10. An eccentrically mounted pin 19 engages in an elongated slot 20 in the arm 16 and a shutter spring 21 secured at one end to the frame 10 and at the other to the pin 19 continually urges the crimped half wheel 12 in a counter-clockwise direction. By holding the handle 15 in one hand and depressing the handle 13 with the other hand, a reciprocating rotatory motion may be imparted to the beating members. An added feature of the embodiment shown in Figure 5 is the addition of a stabilizer 22 which is adapted to be secured to the bottom of the frame 10 to ensure a firm setting of the bottom of the beater against the bottom of the kitchen receptacle. An enlarged perspective view of the stabilizing member is shown in Figure 3 and the member itself consists of a piece of sheet material formed with a trough at 23 which may be crimped around a portion of the frame 10 as at 24 in Figure 1. The stabilizing member 22 is bent to provide seating legs 25 which provide for seating of the beater on a relatively broad base and tend to reduce danger of the beater slipping suddenly on the bottom of the receptacle and splashing the contents of the receptacle in an undesirable fashion. The embodiment shown is extremely durable and it is possible to carry out a prolonged and continuous beating operation with it without being subject to the same degree of fatigue as is occasioned by the use of the normal type of egg beater which requires the continuous rotation of a crank.

What I claim as my invention is:

An egg beater comprising a frame, at least one rotatable beater member, a half-wheel gear and pinion driving means for said beater member, a stationary handle member secured to the top of said frame, a lever pivoted at one end to a projection of said frame, said lever having an elongated radial slot adapted to cooperate with an eccentrically mounted lug on the gear of said gear and pinion driving means, and a handle portion at the free end of said lever, whereby depression of said handle portion causes rotation of said gear by virtue of the engagement of said lug in said slot, and spring means continually urging said lever to its normally uppermost position.

ANDREW SZERENYI.

REFERENCES CITED

The following references are of record in the file of this patent:

UNITED STATES PATENTS

| Number | Name | Date |
|---|---|---|
| 627,977 | Caldwell | July 4, 1899 |
| 649,683 | Spanier | May 15, 1900 |
| 1,255,993 | Dunning | Feb. 12, 1918 |
| 1,788,479 | Bell | Jan. 12, 1931 |